United States Patent
Hippenstiel et al.

(10) Patent No.: US 11,658,864 B1
(45) Date of Patent: May 23, 2023

(54) ADAPTIVE MESSAGE RETENTION

(71) Applicant: INTERNATIONAL BUSINESS MACHINES CORPORATION, Armonk, NY (US)

(72) Inventors: Heinz Peter Hippenstiel, Ehningen (DE); Klaus Rindtorff, Weil im Schoenbuch (DE); Andreas Arning, Tuebingen (DE); Raiko Nitzsche, Aidlingen (DE); Tareq Al-Maamari, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/514,261

(22) Filed: Oct. 29, 2021

(51) Int. Cl.
*H04L 41/069* (2022.01)
*H04L 41/0604* (2022.01)

(52) U.S. Cl.
CPC ........ *H04L 41/069* (2013.01); *H04L 41/0604* (2013.01)

(58) Field of Classification Search
CPC .................... H04L 41/069; H04L 41/0604
USPC ....................................................... 709/223
See application file for complete search history.

(56) References Cited

U.S. PATENT DOCUMENTS

| | | | |
|---|---|---|---|
| 7,249,251 B2 | 7/2007 | Todd | |
| 7,778,979 B2 | 8/2010 | Kimmo | |
| 8,209,567 B2 * | 6/2012 | Cohen | G06F 16/285 714/39 |
| 10,642,505 B1 * | 5/2020 | Kuzmin | G06F 3/0679 |
| 10,911,387 B1 * | 2/2021 | Al Majid | H04L 51/224 |
| 10,938,979 B1 * | 3/2021 | Dave | H04M 1/72454 |
| 10,955,522 B2 * | 3/2021 | Niewczas | G01S 5/14 |
| 11,323,327 B1 * | 5/2022 | Chitalia | H04L 41/0893 |
| 11,327,992 B1 * | 5/2022 | Batsakis | H04L 63/08 |
| 11,334,543 B1 * | 5/2022 | Anwar | G06F 16/254 |
| 11,336,582 B1 * | 5/2022 | Francini | H04L 47/527 |
| 11,409,756 B1 * | 8/2022 | Park | G06F 16/248 |
| 11,416,465 B1 * | 8/2022 | Anwar | G06F 16/285 |
| 2003/0018619 A1 * | 1/2003 | Bae | G06F 11/3476 |
| 2014/0149466 A1 | 5/2014 | Sato | |
| 2017/0091256 A1 | 3/2017 | Gordon | |
| 2019/0379574 A1 | 12/2019 | Sun | |
| 2019/0379625 A1 * | 12/2019 | Coffey | H04L 51/18 |

(Continued)

FOREIGN PATENT DOCUMENTS

| | | |
|---|---|---|
| CN | 106528344 | 3/2017 |
| EP | 2109044 | 10/2009 |

OTHER PUBLICATIONS

Ahkter, J. K., & Soria, S. (2010). Sentiment analysis: Facebook status messages. Unpublished master's thesis, Stanford, CA. (Year: 2010).*

(Continued)

*Primary Examiner* — Melvin H Pollack
(74) *Attorney, Agent, or Firm* — Schmeiser, Olsen & Watts, LLP; Christopher Pignato

(57) ABSTRACT

A method, computer program product, and computer system for retaining messages. Bins for having messages stored for different retention periods are provided. Each message is of a message type. Messages are received and each received message is assigned to a bin. For each message determined to have an age exceeding a retention period of the message's assigned bin, the message is reassigned to a bin having a next higher retention period.

25 Claims, 7 Drawing Sheets

(56) References Cited

U.S. PATENT DOCUMENTS

| | | | | |
|---|---|---|---|---|
| 2020/0293408 | A1* | 9/2020 | Mutha | G06F 11/1451 |
| 2020/0366627 | A1* | 11/2020 | Klassen | H04L 51/08 |
| 2020/0396232 | A1 | 12/2020 | Lee | |
| 2021/0034994 | A1* | 2/2021 | Stocker | G06N 5/04 |
| 2021/0041997 | A1* | 2/2021 | Voss | G06F 3/0482 |
| 2021/0209058 | A1* | 7/2021 | Jung | G06F 16/148 |
| 2021/0248450 | A1* | 8/2021 | Tay | C12N 15/00 |
| 2021/0334630 | A1* | 10/2021 | Lambert | G06N 3/063 |
| 2021/0342361 | A1* | 11/2021 | Radzewsky | G06F 9/548 |
| 2021/0357187 | A1* | 11/2021 | Clement | G06F 40/274 |
| 2021/0357307 | A1* | 11/2021 | Deng | G06F 11/3608 |
| 2022/0100676 | A1* | 3/2022 | Yan | G06N 3/08 |
| 2022/0179720 | A1* | 6/2022 | Byrne | G06F 15/82 |
| 2022/0245091 | A1* | 8/2022 | Batsakis | G06F 16/1824 |

OTHER PUBLICATIONS

Kreps, J., Narkhede, N., & Rao, J. (Jun. 2011). Kafka: A distributed messaging system for log processing. In Proceedings of the NetDB (vol. 11, pp. 1-7). (Year: 2011).*

D. Jayathilake, "Towards structured log analysis," 2012 Ninth International Conference on Computer Science and Software Engineering (JCSSE), 2012, pp. 259-264, doi: 10.1109/JCSSE.2012.6261962. (Year: 2012).*

M. Lemoudden and B. E. Ouahidi, "Managing cloud-generated logs using big data technologies," 2015 International Conference on Wireless Networks and Mobile Communications (WINCOM), 2015, pp. 1-7, doi: 10.1109/WINCOM.2015.7381334. (Year: 2015).*

Suleman Khan, Abdullah Gani, Ainuddin Wahid Abdul Wahab, Mustapha Aminu Bagiwa, Muhammad Shiraz, Samee U. Khan, Rajkumar Buyya, and Albert Y. Zomaya. 2016. Cloud Log Forensics: Foundations, State of the Art, and Future Directions. ACM Comput. Surv. 49, 1, Article 7 (Mar. 2017), 42 pages. (Year: 2016).*

P. A. Bernstein et al., "Adapting microsoft SQL server for cloud computing," 2011 IEEE 27th International Conference on Data Engineering, 2011, pp. 1255-1263, doi: 10.1109/ICDE.2011.5767935. (Year: 2011).*

Mell, Peter et al.; "The NIST Definition of Cloud Computing;" National Institute of Standards and Technology; Special Publication 800-145; Sep. 2011; 7 pages.

Adaptive Data Retention, Search Dynatrace Documentation, https://www.dynatrace.com/support/help/how-to-use-dynatrace/data-privacy-and-security/data-privacy/adaptive-data-retention, 2021 Dynatrace LLC, 5 pages.

Log Retention, https://documentation.solarwinds.com/en/success_center/loggly/content/admin/log-retention.htm?cshid=loggly_log-retention, 2003-2020 SolarWinds Worldwide, LLC., 2 pages.

PCT Application No. PCT/EP2022/079817, filed Oct. 25, 2022, (related application).

PCT International Search Report and Written Opinion, Applicant's file reference P202002164PCT01, dated Jan. 25, 2023, International application No. PCT/EP2022/079817, International filing date Oct. 25, 2022, 11 pages.

* cited by examiner

ADAPTIVE MESSAGE RETENTION

BACKGROUND

The present invention relates in general to message retention, and in particular to adaptive message retention.

SUMMARY

Embodiments of the present invention provide a method, a computer program product and a computer system, for retaining messages.

One or more processors of a computer system provide N bins for storing messages, wherein the N bins are denoted as bins $B_1, B_2, \ldots, B_N$ configured to have messages stored for retention periods $P_1, P_2, \ldots, P_N$, respectively, wherein $P_1 < P_2 < \ldots < P_N$, and wherein $N \geq 1$.

The one or more processors receive a sequence of messages and assigning each received message to the bin $B_1$ as each message is received at an initial time of being received, wherein each received message is of one message type of the M message types $1, 2, \ldots, M$, wherein each message received at the initial time includes a timestamp equal to the initial time of being received, the message type of the message, and a payload.

For each message $U_{mn}$ of message type m and assigned to bin n determined to have an age that exceeds the retention period $P_n$, reassigning, by the one or more processors, the message $U_{mn}$ to bin n+1 if n<N or removing, by the one or more processors, the payload from the message $U_{mn}$ if n=N, wherein m is $1, 2, \ldots$ or M and n is $1, 2, \ldots,$ or N.

DETAILED DESCRIPTION

Figure 1:
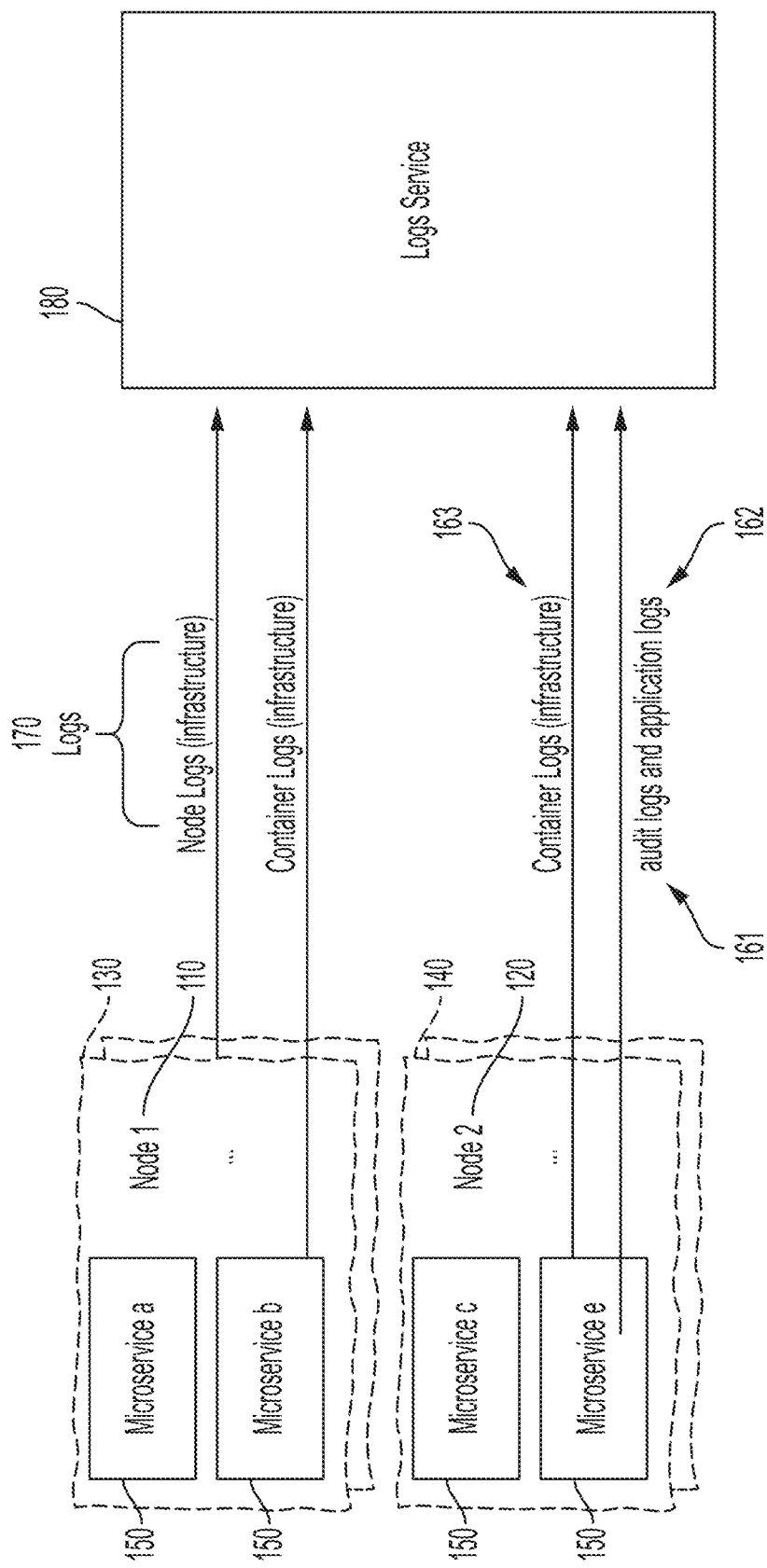
FIG. 1 depicts an illustrative example of a system illustrating how embodiments of the present invention may be used.

Computer system applications typically generate messages during execution of the applications to provide information regarding debugging, error analysis, system behavior, etc. Such messages (called "log messages") may be collected into log files called "logs" which may be stored within the computer system.

In a cloud environment and other computer environments, systems typically generate a very high number of log messages containing very detailed information. Some of these log messages will be retrieved within a rather short time after the log messages have been generated in order to be analyzed for providing, inter alia, a current status of the system or for debugging purposes. Other messages will be accessed only after a longer time period and analyzed to provide information about long-term activities and performance of the system. Some messages will only be accessed in order to analyze specific system activities such as in the context of an audit or a forensic analysis in response to a security incident.

Embodiments of the present invention adjust a retention period of messages from a system log message stream as well as from other message sources. The embodiments record a retention period and access to message types in an access list and check the messages in the logs against a current retention period and adjust the retention period as determined by various factors, including inter alia message access patterns from users.

The scope of embodiments of the present invention includes a development environment as well as a cloud production environment (e.g., a cloud production environment). In a development environment, embodiments of the present invention may minimize storage that needs to be reserved for debugging messages based on such factors as origin, date, severity, etc. In a production environment, embodiments of the present invention may be used by administrators to control archival of application-oriented messages based on such factors as tenant, origin, date, severity, user action, etc.

For embodiments of the present invention, the scope of 'user' may include any person or computer triggering an update of factors relating to message retention.

A single system log stream may be divided in N partial streams. (N≥2). Each partial stream contains the messages for a certain period of time (called a "retention period"), in a non-linear proportion in one embodiment. For example, a first partial stream may contain messages for up to a week (7 days), a second partial stream may contain messages for up to a month (30 days), and third partial stream may contain messages for up to a year (365 days). The partial streams may be connected to each other sequentially and messages transition from one partial stream to a next partial stream in a first-in-first-out manner.

A partial stream is also called a "bin", and "partial stream" and "bin" have a sane meaning and may be used interchangeably.

"Partial stream" and "bin" do not relate to where and/or how messages are stored, but rather relate to how long the messages are stored.

Bins have associated retention periods for storing messages but do not store messages. Thus, a message in a bin is not physically stored in the bin, but rather is stored (somewhere) up to a time corresponding to the retention period of the bin.

A retention period of given bin is defined as encompassing a period of time from a time of creation of a message in the first bin to a time corresponding to the end of the retention period of the given bin. A message is created in the first bin at a time when the message is first persisted in storage (e.g., written to a disk or other storage media). Bins overlap in time and a message can be assigned to only one bin at a time. For example, for a three-bin configuration of a first bin of 7 days, a second bin of 30 days, and a third bin of 365 days, a message can spend up 7 days in the first bin, up to 23 days in the second bin, and up to 335 days in the third bin.

The preceding example of a three-bin configuration (7 days, 30 days, 365 days) is for illustrative purposes only, and a total number of bins (N) is constrained only by a limitation of N≥2.

For example, a five-bin configuration my include bins having retention times of 10 days, 30 days, 60 days, 120 days, and 360 days, or may include bins having retention times of 1 day, 5 days, 25 days, 50 days, and 100 days, or may include bins having retention times of 30 days, 60 days, 120 days, 300 days, and 600 days.

As another example, a fifteen-bin configuration may include bins having retention times of 30 days, 60 days, 90 days, 120 days, 150 days, 180 days, 210 days, 240 days, 270 days, 300 days, 330 days, 360 days, 390 days, 420 days, and 450 days.

As another example, a six-bin configuration may include bins having retention times of 1 hour, 3 hours, 8 hours, 12 hours, 18 hours, and 24 hours.

An "age" (A) of a message contained in any bin is defined as a current time minus a time of creation of the message in the first bin.

For embodiments of the present invention, messages are classified into message types determined by such parameters as, inter alia, origin of message, destination of message, content or subject of message, severity or security level of message, size of message (e.g., in bytes), etc. A message type identifier for the message type of each message is contained in each message.

Each message includes a timestamp denoting the time of entry of a message into the first bin, the message type of the message, and the message's payload which is the subject matter content of the message.

An access list contains for each message type: a retention time and a maximum time for access to a message of a message type. Each retention time in the access list is equal to a time period of one of the bins.

In embodiments of the present invention, the messages in the bins are monitored and checked (periodically, at a sequence of non-uniformly distributed times, or at random times) against the retention time and/or maximum time of the associated message types in the access list, which may result in messages being destroyed, messages being moved to a next higher bin, and/or messages having the message's payload removed, as described infra.

In embodiments of the present invention, a user's access of a message may trigger a check of the message's age against the maximum time and/or retention time of the message type of the message in the access list, which may result in the maximum time and/or the retention time in the access list being changed, as described infra.

In embodiments of the present invention, a user's access of a message may trigger presentation to the user of an option to change the retention time of the message type of the message in the access list, as described infra.

In embodiments of the present invention, special messages may require a very long or permanent retention period even if not accessed, because such special messages may contain special data (e.g., data governed by legal regulations). The message type for such special messages can be marked appropriately by users so that the special messages of the marked message type are excluded from being destroyed and/or having the payload removed and are retained for a specifically needed retention period.

The following description of a use-case uses a scenario from a perspective of a cloud end-user, in which a customer is running a pet shop. The customer's employees maintain a catalog of pet related offerings for sale on a site running in the cloud. The company grows and so does the company's pet shop. All changes to the artwork, special offers and catalog are captured and pertinent logs are kept for one year. After a while, it becomes evident that keeping the logs becomes too expensive. Rather than deciding which logs to keep and which logs to no longer record, the pet shop can make use of an adaptive-log-service in accordance with embodiments of the present invention. Supervisors that check the logs in case of incidents will be able to search for all activities during site maintenance. As the supervisors focus on catalogs changes and search for the catalog changes often, the system adapts after a while and the logs for offers are kept only for one month, while the logs for catalog changes continue to be available for a year. The logs for artwork were never checked in the past and over time the retention period went down from one year to the minimum of one week, saving a lot of resources. When suddenly problems occurred around artwork and access to artwork-related logs as old as three months were needed because of a merger, the needed artwork-related logs were initially not available. However, the system adapted itself and changed the retention time back from a week to three months. After a year the merger was over, searches for artwork-related logs ceased and the system gradually reduced the retention time back to the necessary retention time and then to the minimum retention time. After the year, access to the catalog continued to cover a time between a week and one year and the retention time never changed. Access to offers continued to happen occasionally and never for any offers older than one month, so no adaption of the retention period happened for the offers either. Substantial savings in the use of resource were achieved without the need for continuous adaption of retention policies.

FIG. 1 depicts an illustrative example of a system illustrating how embodiments of the present invention may be used.

The system has multiple microservices 150 to handle Human Resources operations for a tenant called ABC. The system is deployed on a cluster 130, 140 of computing resources. The microservices 150 are containerized and deployed on different nodes 110, 120 on the cluster 130, 140. Logs generated from the system range from infrastructure logs (containers and host nodes) to application and audit logs/events.

Logs of type "audit" 161 have a retention period of 360 days. Logs of type "application" 162 have a retention period of 30 days. Logs of type "infrastructure" 163 have a retention period of 7 days. Thus, there are three bins with retention periods of 7 days, 30 days, and 365 days corresponding to log types of "infrastructure". "application", and "audit", respectively. Logs 170 encompass node logs (infrastructure) and container logs (infrastructure). Logs service 180 provide services for the logs such as, inter alia, storing the logs and retaining the logs in accordance with the log type retention periods. The node logs, container logs, and audit logs and container logs all flow into logs service 180.

A developer is looking for an explanation of an error reported by tenant ABC. The developer looks for type==infrastructure AND tenant==ABC in a search. The search returns a large amount of hits from all bins. Each hit is represented on-screen by a summary showing of, for example, the timestamp and message type with a collapsed payload that does not include the content of the payload. The developer can select the summary and open (i.e., expand) the payload to attempt to see the content of the payload.

Assuming that the retention level of the current message type is 7 days, payloads will be available for all hits that are less than 7 days old and payloads will not be available for hits that are older than 7 days, which will trigger an action. The triggered action is in accordance with a description of embodiments of the present invention in accordance with flow charts depicted in FIGS. 2-4.

Figure 2:
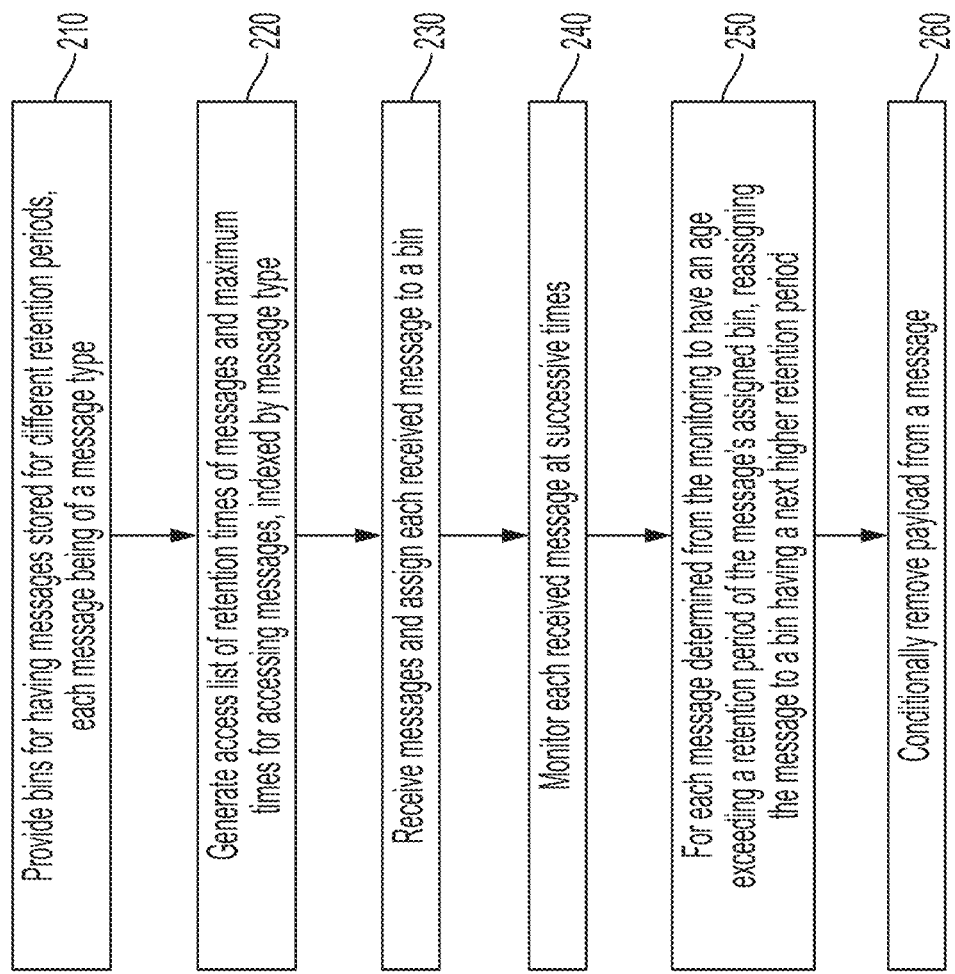
FIG. 2 is a flow chart describing a method for retaining messages, in accordance with embodiments of the present invention.

FIG. 2 is a flow chart describing a method for retaining messages, in accordance with embodiments of the present invention. The flow chart of FIG. 2 includes steps 210-260.

Step 210 provides N bins denoted as bins $B_1, B_2, \ldots, B_N$ configured to have messages stored for retention periods $P_1, P_2, \ldots, P_N$, respectively, wherein $P_1 < P_2 < \ldots < P_N$, and wherein $N \geq 1$.

Step 220 generates an access list comprising an identification of M message types denoted as message types 1, 2, ..., M and respective retention times $T_1, T_2, \ldots, T_M$ and respective maximum times $X_1, X_2, \ldots, X_M$ for access by a user to a received message, wherein $M \geq 1$. Each retention time of the retention times $T_1, T_2, \ldots, T_M$ is equal to one retention period of the retention periods $P_1, P_2, \ldots, P_N$ of the bins. Generating the access list comprises setting $T_1, T_2, \ldots, T_M$ to initial values of $T_1, T_2, \ldots, T_M$ and setting $X_1, X_2, \ldots, X_M$ to initial values of $X_1, X_2, \ldots, X_M$.

Step 230 receives a sequence of messages and assigns each received message to the bin $B_1$ as each message is received at an initial time of being received. Each received message is of one message type of the M message types 1, 2, ..., M. Each message received at the initial time includes a timestamp equal to the initial time of being received, the message type of the message, and a payload.

Step 240 monitors each received message at each time of successive times separated by a timestep ($\Delta T$) subject to constraining $\Delta T$ to be smaller than the retention period $P_1$ and if $N \geq 2$ smaller than $P_{n+1} - P_n$ for $n = 1, 2, \ldots, N-1$. The preceding constraint on upper-limiting values of $\Delta T$ ensures that the timestep ($\Delta T$) for monitoring is smaller than $P_1$ and also smaller than the maximum length of time ($P_{n+1} - P_n$) that a message can be assigned to any bin n+1 ($n = 1, 2, \ldots, N-1$). The timestep ($\Delta T$) can be constant, variable, or randomly selected subject to the preceding constraint on upper-limiting values of $\Delta T$.

For each message $U_{mn}$ of message type m and assigned to bin n determined (from the monitoring in step 240 in one embodiment) to have an age (A) that exceeds the retention period $P_n$, step 250 reassigns the message $U_{mn}$ to bin n+1 if $n < N$ or removes the payload from the message $U_{mn}$ if $n = N$, wherein m is 1, 2, ... or M and n is 1, 2, ..., or N. The destruction of the message $U_{mn}$ if $n = N$ is a consequence of the fact that the message $U_{mn}$ cannot be reassigned to a non-existent bin N+1. Destruction of a message can be prevented by making the retention period of bin N longer than a maximum expected age of any message.

The "age" (A) of a message contained in any bin is defined as a current time minus a time of entry of the message into the first bin.

For each message $U_{mn}$ whose age (A) exceeds the retention period $P_n$ and which includes a payload and for which $n < N$ and whose message type's maximum time $X_m$ in the access list is less than the retention period $P_{n+1}$, step 260 removes the payload from the message $U_{mn}$. The preceding limitation of $n < N$, which excludes $n = N$, is due to the fact that $P_{n+1}$ does not exist if $n = N$ because bin N+1 does not exist.

Figure 3:
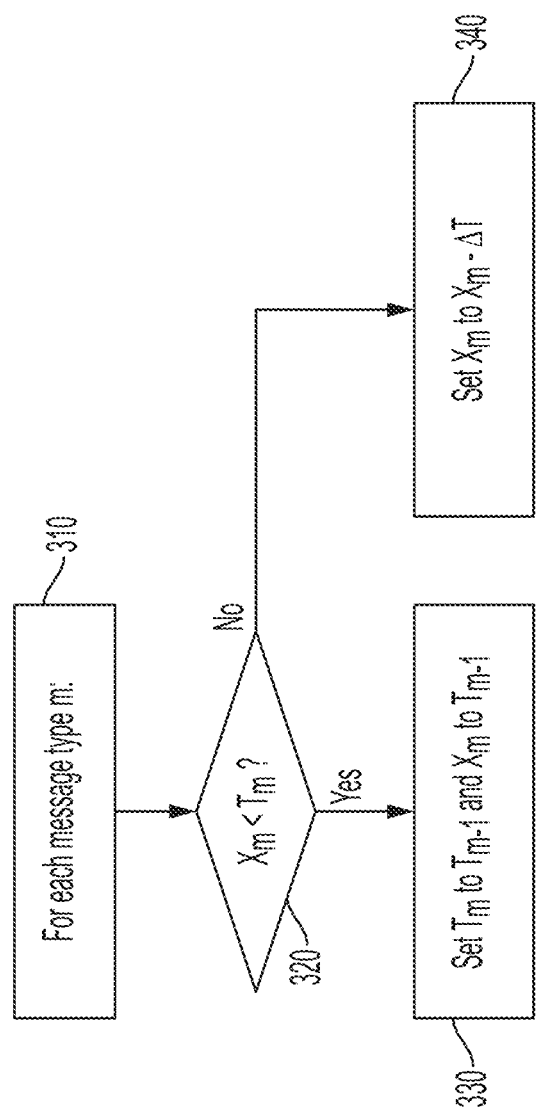
FIG. 3 is a flow chart describing further embodiments of the method of FIG. 2 with respect to messages received at successive times.

FIG. 3 is a flow chart describing further embodiments of the method of FIG. 2 with respect to messages received at successive times in step 240 of FIG. 2. The flow chart of FIG. 3 includes steps 310-340.

Step 310 establishes that subsequent steps 320-340 are for each message type m.

Step 320 determines whether the maximum time $X_m$ is less than the retention time $T_m$.

If step 320 determines that $X_m$ is less than $T_m$, then step 330 sets $T_m$ to $T_{m-1}$ and $X_m$ to $T_{m-1}$ in the access list, wherein $M \geq 2$.

If step 320 does not determine that $X_m$ is less than $T_m$, (i.e., or equivalently, step 320 determines that $X_m \geq T_m$), step 330 sets $X_m$ to $X_m - \Delta T$ in the access list, wherein $\Delta T$ is a timestep (i.e., time increment) between successive times at which each received message is monitored.

Figure 4:
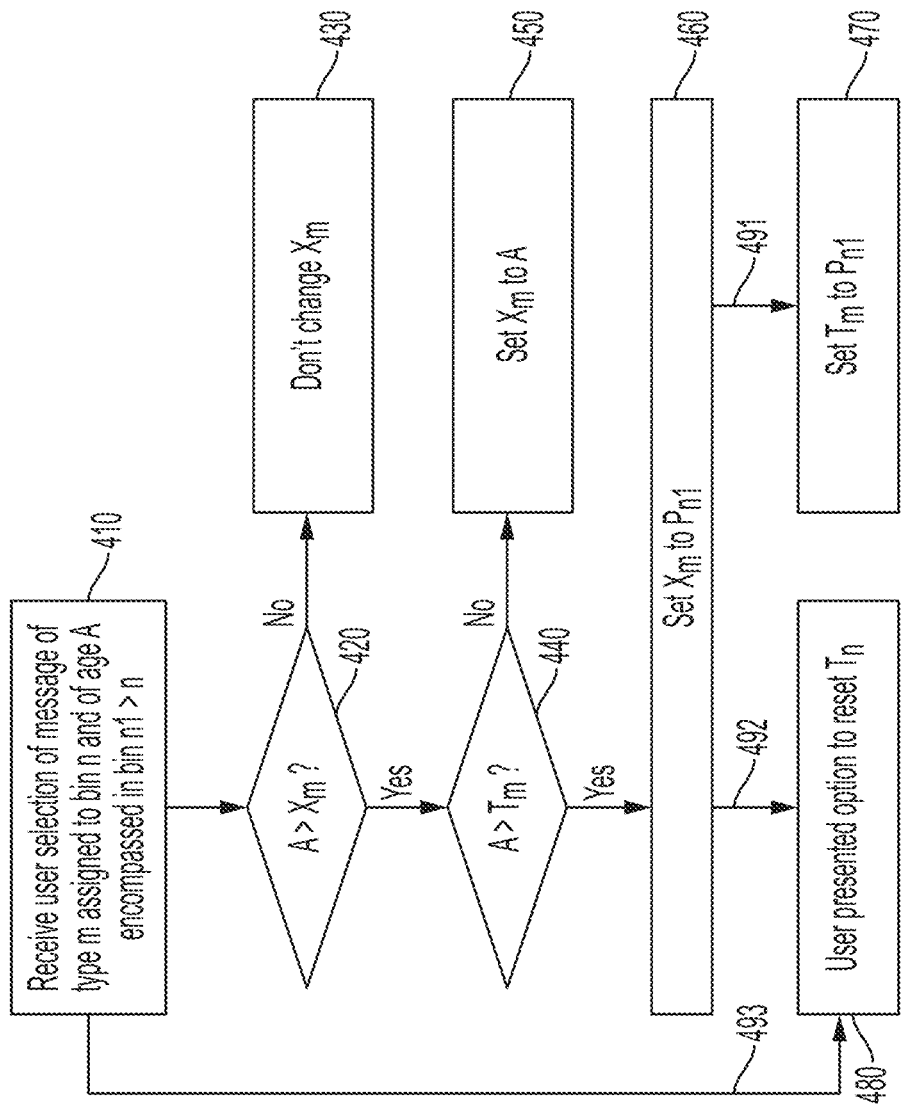
FIG. 4 is a flow chart describing further embodiments of the method of FIG. 2 with respect to changing a maximum time for accessing a message in consideration of an age of the message.

FIG. 4 is a flow chart describing further embodiments of the method of FIG. 2 with respect to changing a maximum time for accessing a message, in consideration of an age (A) of the message.

Step 410 receives, from a user, a selection a message $V_{mn}$ of message type m and assigned to bin n from a list of messages such that m is 1, 2, ... or M and n is 1, 2, ..., or N.

Step 420 determines whether the age A of the message is greater than the message type's maximum time $X_m$ in the access list, wherein $N \geq 2$, and wherein the age A is encompassed by a retention period $P_{n1}$ of a bin n1 and $n1 > n$. If so, step 440 is next executed. If not, the constraint relating to reference numeral 430 is satisfied.

The meaning of "encompassed by a retention period" is illustrated by the following examples. If N=3 with the three bins having retention periods of 7 days, 30 days and 360 days: a message's age of 5 days in encompassed by the retention period of 7 days of the first bin, a message's age of 15 days in encompassed by the retention period of 30 days of the second bin, and a message's age of 100 days in encompassed by the retention period of 365 days of the third bin.

Reference numeral 430 pertains to satisfying a constraint of $X_m$ not being changed.

Step 440 determines whether the age A of the message is greater than the message type's retention time $T_m$ in the access list. If so, step 460 is next executed. If not, step 450 is next executed.

Step 450 sets $X_m$ to A.

Step 460 sets $X_m$ to $P_{n1}$.

Steps 470 and 480 can each be reached via branches 491 and 492, respectively, from step 460 to reset $T_m$ in the access list.

Step 470, upon being reached from step 460 via branch 491, sets $T_m$ to $P_{n1}$.

Step 480, upon being reached from step 460 via branch 492, presents to the user an option of increasing the retention time $T_m$ in the access list, if $T_m < P_N$, to a retention period selected from a subset of $P_1, P_2, \ldots,$ and $P_N$ subject to each retention period in the subset exceeding $T_m$.

Step 480 can also be reached from step 410 via branch 493, wherein step 480 presents to the user an option of increasing or decreasing the retention time $T_m$ in the access list to a retention period selected from a subset of $P_1, P_2, \ldots,$ and $P_N$ subject to each retention period in the subset being unequal to $T_m$.

Figure 5:
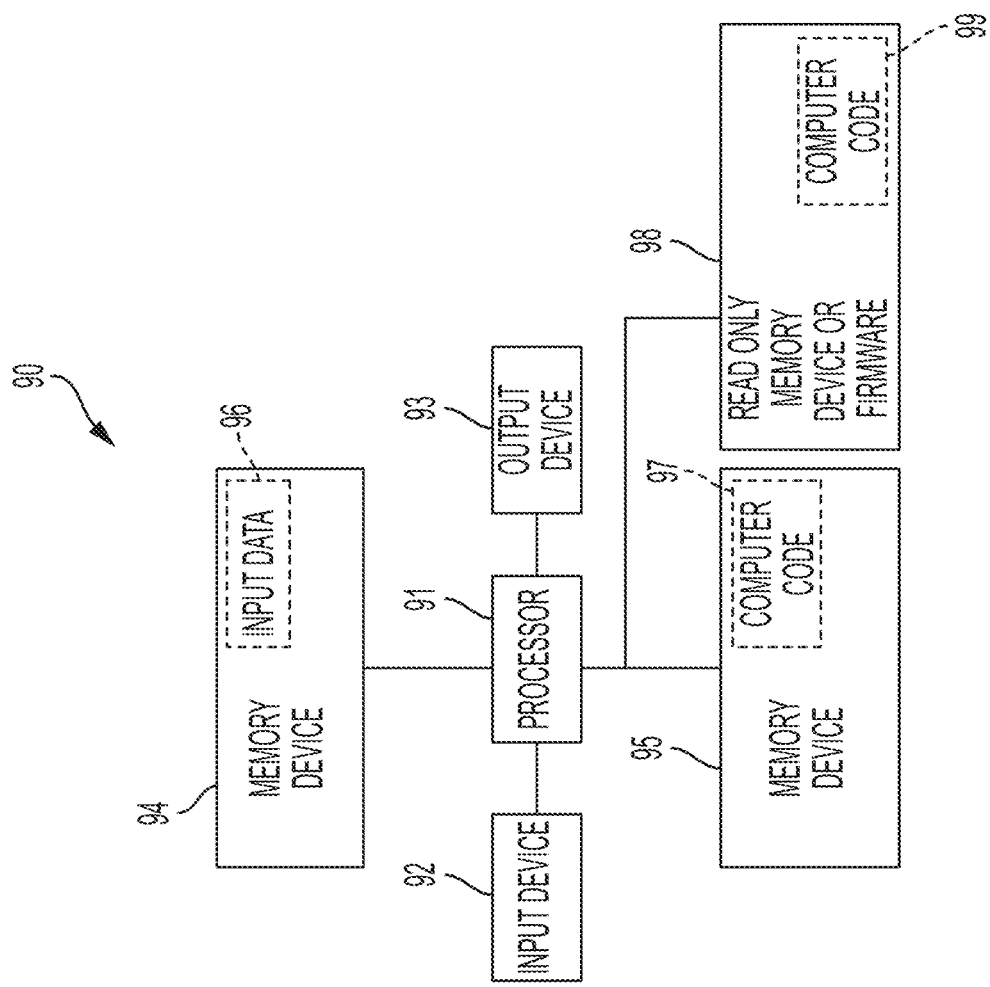
FIG. 5 illustrates a computer system, in accordance with embodiments of the present invention.

FIG. 5 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
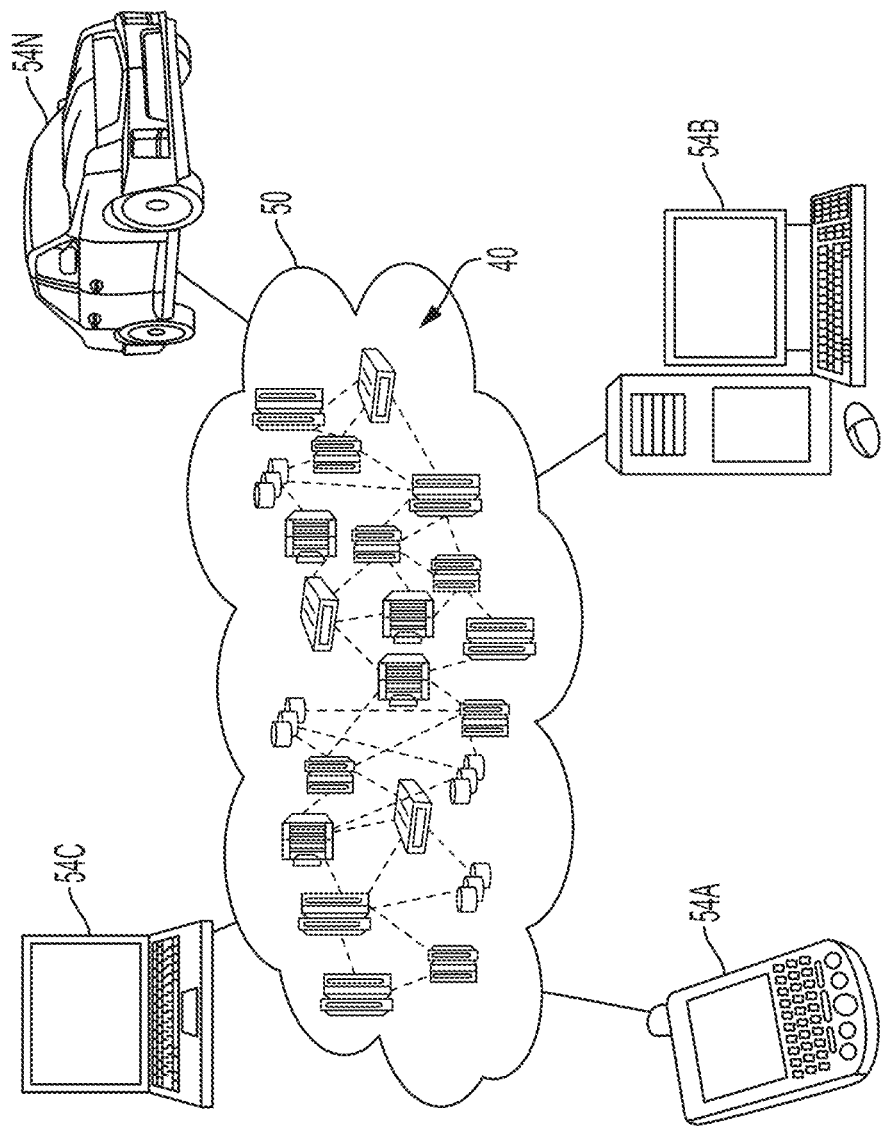
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
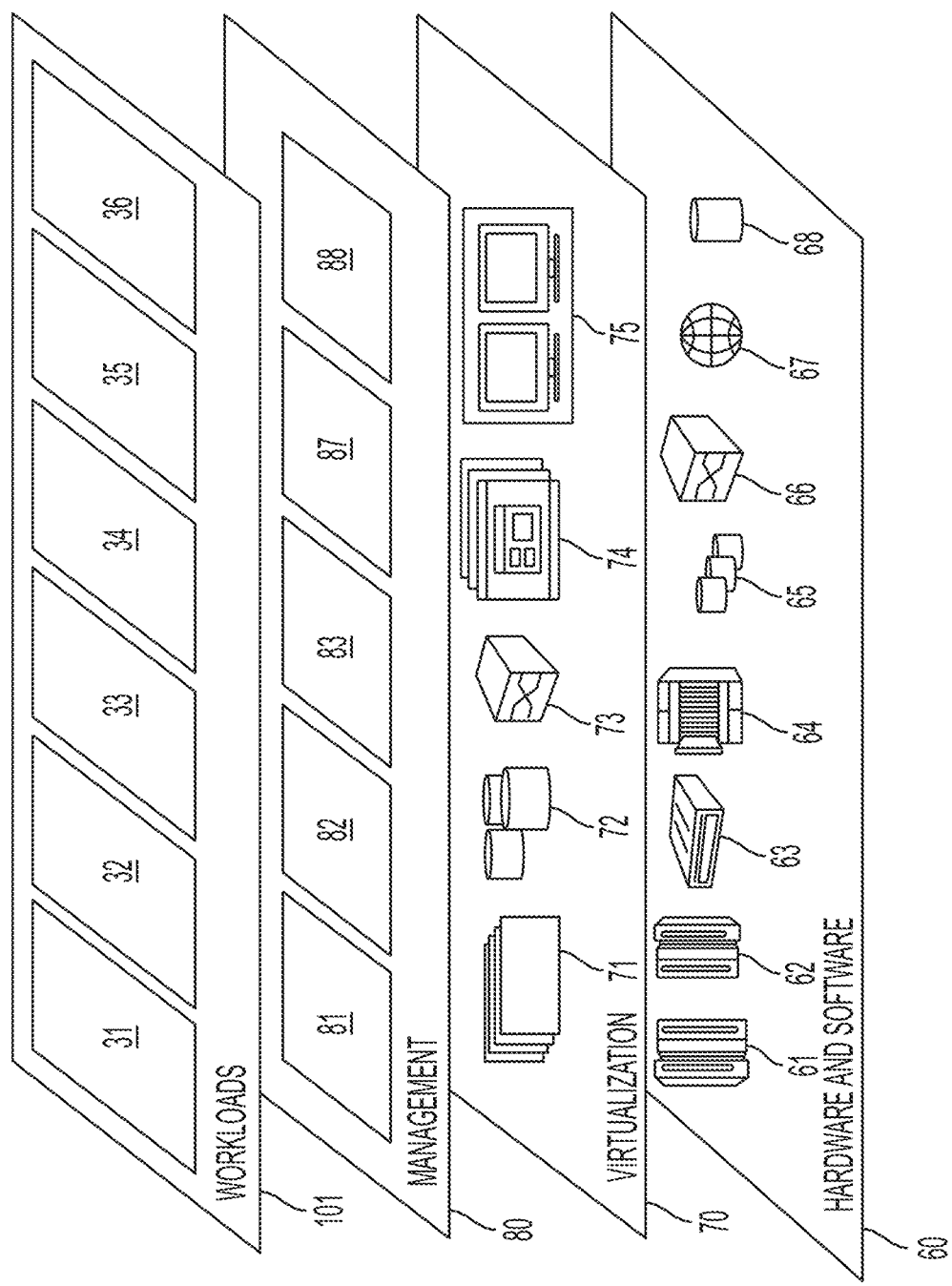
FIG. 7 depicts abstraction model layers, in accordance with embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and message retention 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for retaining messages, said method comprising:

providing, by one or more processors of a computer system, N bins for storing messages, wherein the N bins are denoted as bins $B_1, B_2, \ldots, B_N$ configured to have messages stored for retention periods $P_1, P_2, \ldots, P_N$, respectively, wherein $P_1<P_2<\ldots<P_N$, and wherein $N\geq 1$;

receiving, by the one or more processors, a sequence of messages and assigning each received message to the bin $B_1$ as each message is received at an initial time of being received, wherein each received message is of one message type of M message types $1, 2, \ldots, M$, wherein $M\geq 1$, and wherein each message received at the initial time includes a timestamp equal to the initial time of being received, the message type of the message, and a payload; and for each message $U_{mn}$ of message type m and assigned to bin $B_n$ and having an age exceeding the retention period $P_n$, reassigning, by the one or more processors, the message $U_{mn}$ to bin $B_{n+1}$ if $n<N$ or removing, by the one or more processors, the payload from the message $U_{mn}$ if $n=N$, wherein m is $1, 2, \ldots$ or M and n is $1, 2, \ldots$, or N.

2. The method of claim 1, wherein the method further comprises:

monitoring, by the one or more processors, each received message at each time of successive times separated by a timestep ($\Delta T$) smaller than the retention period $P_1$ and if $N\geq 2$ then $\Delta T$ is smaller than $P_{n+1}-P_n$ for $n=1, 2, \ldots, N-1$.

3. The method of claim 1, wherein the method further comprises:

generating, by the one or more processors, an access list comprising an identification of the M message types denoted as message types $1, 2, \ldots, M$ and respective retention times $T_1, T_2, \ldots, T_M$ and respective maximum times $X_1, X_2, \ldots, X_M$ for access by a user to a received message, wherein each retention time of the retention times $T_1, T_2, \ldots, T_M$ is equal to one retention period of the retention periods $P_1, P_2, \ldots, P_N$, and wherein said generating the access list comprises setting $T_1, T_2, \ldots, T_M$ to initial values of $T_1, T_2, \ldots, T_M$ and setting $X_1, X_2, \ldots, X_M$ to initial values of $X_1, X_2, \ldots, X_M$.

4. The method of claim 3, wherein for said each message $U_{mn}$ whose age exceeds the retention period $P_n$ and which includes a payload and for which $n<N$ and whose maximum time $X_m$ in the access list is less than the retention period $P_{n+1}$, removing, by the one or more processors, the payload from the message $U_{mn}$.

5. The method of claim 3, wherein $M\geq 2$, and wherein at each time of the successive times, the method further comprises for each message type $m\geq 2$ in the access list:

determining, by the one or more processors, whether $X_m<T_m$ in the access list, and if so then setting, by the one or more processors, $T_m$ to $T_{m-1}$ and $X_m$ to $T_{m-1}$ in the access list.

6. The method of claim 3, wherein at each time of the successive times, the method further comprises for each message type m in the access list:

determining, by the one or more processors, whether $X_m \geq T_m$ in the access list, and if so then setting, by the one or more processors, $X_m$ to $X_m-\Delta T$ in the access list.

7. The method of claim 3, wherein the method further comprises:

receiving, by the one or more processors from a user, a selection a message $V_{mn}$ of message type m and assigned to bin $B_n$ from a list of messages such that m is $1, 2, \ldots$ or M and n is $1, 2, \ldots$, or N.

8. The method of claim 7, wherein $N\geq 2$, and wherein the method further comprises:

determining, by the one or more processors, that an age A of the message $V_{mn}$ exceeds both $X_m$ and $T_m$ wherein the age A is encompassed by a retention period $P_{n1}$ of a bin $B_{n1}$ and $n1>n$ and in response, setting, by the one or more processors, $T_m$ to $P_{n1}$ and $X_m$ to $P_{n1}$ in the access list.

9. The method of claim 7, wherein the method further comprises:

determining, by the one or more processors, that an age A of the message $V_{mn}$ exceeds $X_m$ and does not exceed $T_m$ and in response, setting, by the one or more processors, $X_m$ to the age A in the access list.

10. The method of claim 7, wherein the method further comprises:

determining, by the one or more processors, that an age of the message $V_{mn}$ exceeds $X_m$; and presenting, by the one or more processors to the user, an option of resetting the retention time $T_m$ in the access list, if $T_m<P_N$, to a retention period selected from a subset of $P_1, P_2, \ldots,$ and $P_N$ subject to each retention period in the subset exceeding $T_m$.

11. The method of claim 7, wherein the method comprises:

presenting, by the one or more processors to the user, an option of resetting the retention time $T_m$ in the access list.

12. A computer program product, comprising one or more computer readable hardware storage devices having computer readable program code stored therein, said program code containing instructions executable by one or more processors of a computer system to implement a method for retaining messages, said method comprising:

providing, by the one or more processors, N bins for storing messages, wherein the N bins are denoted as bins $B_1, B_2, \ldots, B_N$ configured to have messages stored for retention periods $P_1, P_2, \ldots, P_N$, respectively, wherein $P_1<P_2<\ldots<P_N$, and wherein $N\geq 1$;

receiving, by the one or more processors, a sequence of messages and assigning each received message to the bin $B_1$ as each message is received at an initial time of being received, wherein each received message is of one message type of M message types $1, 2, \ldots, M$, wherein $M\geq 1$, and wherein each message received at the initial time includes a timestamp equal to the initial time of being received, the message type of the message, and a payload; and for each message $U_{mn}$ of message type m and assigned to bin $B_n$ and having an age exceeding the retention period $P_n$, reassigning, by the one or more processors, the message $U_{mn}$ to bin $B_{n+1}$ if $n<N$ or removing, by the one or more processors, the payload from the message $U_{mn}$ if $n=N$, wherein m is $1, 2, \ldots$ or M and n is $1, 2, \ldots$, or N.

13. The computer program product of claim 12, wherein the method further comprises:
   monitoring, by the one or more processors, each received message at each time of successive times separated by a timestep ($\Delta T$) smaller than the retention period $P_1$ and if $N \geq 2$ then $\Delta T$ is smaller than $P_{n+1} - P_n$ for $n=1, 2, \ldots, N-1$.

14. The computer program product of claim 12, wherein the method further comprises:
   generating, by the one or more processors, an access list comprising an identification of the M message types denoted as message types $1, 2, \ldots, M$ and respective retention times $T_1, T_2, \ldots, T_M$ and respective maximum times $X_1, X_2, \ldots, X_M$ for access by a user to a received message, wherein each retention time of the retention times $T_1, T_2, \ldots, T_M$ is equal to one retention period of the retention periods $P_1, P_2, \ldots, P_N$, and wherein said generating the access list comprises setting $T_1, T_2, \ldots, T_M$ to initial values of $T_1, T_2, \ldots, T_M$ and setting $X_1, X_2, \ldots, X_M$ to initial values of $X_1, X_2, \ldots, X_M$.

15. The computer program product of claim 14, wherein for said each message $U_{mn}$ the retention period $P_n$ and which includes a payload and for which $n<N$ and whose maximum time $X_m$ in the access list is less than the retention period $P_{n+1}$, removing, by the one or more processors, the payload from the message $U_{mn}$.

16. The computer program product of claim 14, wherein $M \geq 2$, and wherein at each time of the successive times, the method further comprises for each message type $m \geq 2$ in the access list:
   determining, by the one or more processors, whether $X_m < T_m$ in the access list, and if so then setting, by the one or more processors, $T_m$ to $T_{m-1}$ and $X_m$ to $T_{m-1}$ in the access list.

17. The computer program product of claim 14, wherein at each time of the successive times, the method further comprises for each message type m in the access list:
   determining, by the one or more processors, whether $X_m \geq T_m$ in the access list, and if so then setting, by the one or more processors, $X_m$ to $X_m - \Delta T$ in the access list.

18. A computer system, comprising one or more processors, one or more memories, and one or more computer readable hardware storage devices, said one or more hardware storage devices containing program code executable by the one or more processors via the one or more memories to implement a method for retaining messages, said method comprising:
   providing, by the one or more processors, N bins for storing messages, wherein the N bins are denoted as bins $B_1, B_2, \ldots, B_N$ configured to have messages stored for retention periods $P_1, P_2, \ldots, P_N$, respectively, wherein $P_1 < P_2 < \ldots < P_N$, and wherein $N \geq 1$;
   receiving, by the one or more processors, a sequence of messages and assigning each received message to the bin $B_1$ as each message is received at an initial time of being received, wherein each received message is of one message type of M message types $1, 2, \ldots, M$, wherein $M \geq 1$, and wherein each message received at the initial time includes a timestamp equal to the initial time of being received, the message type of the message, and a payload; and
   for each message $U_{mn}$ of message type m and assigned to bin $B_n$ and having an age exceeding the retention period $P_n$, reassigning, by the one or more processors, the message $U_{mn}$ to bin $B_{n+1}$ if $n<N$ or removing, by the one or more processors, the payload from the message $U_{mn}$ if $n=N$, wherein m is $1, 2, \ldots$ or M and n is $1, 2, \ldots$, or N.

19. The computer system of claim 18, wherein the method further comprises:
   monitoring, by the one or more processors, each received message at each time of successive times separated by a timestep ($\Delta T$) smaller than the retention period $P_1$ and if $N \geq 2$ then $\Delta T$ is smaller than $P_{n+1} - P_n$ for $n=1, 2, \ldots, N-1$.

20. The computer system of claim 18, wherein the method further comprises:
   generating, by the one or more processors, an access list comprising an identification of the M message types denoted as message types $1, 2, \ldots, M$ and respective retention times $T_1, T_2, \ldots, T_M$ and respective maximum times $X_1, X_2, \ldots, X_M$ for access by a user to a received message, wherein each retention time of the retention times $T_1, T_2, \ldots, T_M$ is equal to one retention period of the retention periods $P_1, P_2, \ldots, P_N$, and wherein said generating the access list comprises setting $T_1, T_2, \ldots, T_M$ to initial values of $T_1, T_2, \ldots, T_M$ and setting $X_1, X_2, \ldots, X_M$ to initial values of $X_1, X_2, \ldots, X_M$.

21. The computer system of claim 18, wherein for said each message $U_{mn}$ whose age exceeds the retention period $P_n$ and which includes a payload and for which $n<N$ and whose maximum time $X_m$ in the access list is less than the retention period $P_{n+1}$, removing, by the one or more processors, the payload from the message $U_{mn}$.

22. A method for retaining messages, said method comprising:
   providing, by one or more processors of a computer system, bins for having messages stored for different retention periods, each message being of a message type;
   receiving, by the one or more processors, messages and assign each received message to one of the bins; and
   for each message having an age exceeding a retention period of the message's assigned bin, reassigning, by the one or more processors, the message to a bin having a next higher retention period.

23. The method of claim 22, wherein the method further comprises:
   monitoring, by the one or more processors, each received message at successive times.

24. The method of claim 22, wherein the method further comprises:
   generating, by the one or more processors, an access list of retention times of messages and maximum times for accessing messages, indexed by message type.

25. The method of claim 24, wherein the method further comprises:
   determining, by the one or more processors, that a message's age exceeds the retention period of the message's assigned bin and that the maximum time, in the access list, of the message's message type is less than the retention period of the bin having the next higher retention period and in response, removing, by the one or more processors, a payload from the message.

* * * * *